United States Patent
Aoyama et al.

(10) Patent No.: US 11,401,997 B2
(45) Date of Patent: Aug. 2, 2022

(54) MOTOR WITH SPEED REDUCTION MECHANISM

(71) Applicant: DENSO CORPORATION, Kariya (JP)

(72) Inventors: Tomohiro Aoyama, Kariya (JP); Isamu Adachi, Kariya (JP); Satoshi Annen, Kariya (JP)

(73) Assignee: DENSO CORPORATION, Kariya (JP)

( * ) Notice: Subject to any disclaimer, the term of this patent is extended or adjusted under 35 U.S.C. 154(b) by 171 days.

(21) Appl. No.: 16/765,309

(22) PCT Filed: Dec. 18, 2018

(86) PCT No.: PCT/JP2018/046583
§ 371 (c)(1),
(2) Date: May 19, 2020

(87) PCT Pub. No.: WO2019/142577
PCT Pub. Date: Jul. 25, 2019

(65) Prior Publication Data
US 2020/0386298 A1    Dec. 10, 2020

(30) Foreign Application Priority Data
Jan. 17, 2018    (JP) .............................. JP2018-005866

(51) Int. Cl.
*F16H 1/16*    (2006.01)
*F16H 1/06*    (2006.01)
(Continued)

(52) U.S. Cl.
CPC ................ *F16H 1/16* (2013.01); *F16H 1/06* (2013.01); *B60S 1/583* (2013.01); *F16H 21/40* (2013.01);
(Continued)

(58) Field of Classification Search
CPC ... F16H 1/16; F16H 1/06; F16H 21/40; F16H 27/08; F16H 2057/0213; B60S 1/583
See application file for complete search history.

(56) References Cited

U.S. PATENT DOCUMENTS 4,641,544 A *  2/1987 Russ ..................... E05F 15/611
                                                      74/405
7,568,257 B2 * 8/2009 Yagi ....................... B60S 1/166
                                                     15/250.3
(Continued)

FOREIGN PATENT DOCUMENTS

| JP | 2008-37173 A | 2/2008 |
| JP | 2008-87550 A | 4/2008 |
| JP | 2012-137114 A | 7/2012 |

OTHER PUBLICATIONS

Mar. 19, 2019 Search Report issued in International Patent Application No. PCT/JP2018/046583.

*Primary Examiner* — Zakaria Elahmadi
(74) *Attorney, Agent, or Firm* — Oliff PLC (57) ABSTRACT

A motor includes a motor unit, a speed reduction mechanism, a motion conversion mechanism, and a housing. The motion conversion mechanism converts rotary motion of the speed reduction. mechanism into reciprocating rotary motion and transmits the motion to an output shaft. The speed reduction mechanism includes a worm, a first gear, and a second gear. The worm is disposed on a rotation shaft of the motor unit. The first gear transmits rotation of the worm and rotates about a first shaft. The second gear receives rotation of the first gear and rotates about a second shaft. The motion conversion mechanism includes a rotary member and a rod. The rotary member includes a sector gear and rotates about an axis of the first shaft. The rod couples the second gear and the rotary member. The output shaft includes an output gear that engages the sector gear.

12 Claims, 5 Drawing Sheets

(51) Int. Cl.
 *B60S 1/58* (2006.01)
 *F16H 21/40* (2006.01)
 *F16H 27/08* (2006.01)
 *F16H 57/021* (2012.01)

(52) U.S. Cl.
 CPC ...... *F16H 27/08* (2013.01); *F16H 2057/0213* (2013.01)

(56) References Cited

U.S. PATENT DOCUMENTS

| | | | | |
|---|---|---|---|---|
| 8,171,597 | B2* | 5/2012 | Yagi | B60S 1/26 15/250.3 |
| 9,555,773 | B2* | 1/2017 | Stefani | F16H 55/17 |
| 2005/0097698 | A1* | 5/2005 | Yagi | F16D 7/044 15/250.3 |
| 2005/0097699 | A1* | 5/2005 | Yagi | F16D 7/044 15/250.3 |
| 2006/0053921 | A1* | 3/2006 | Kawamura | B60R 25/02153 74/425 |
| 2006/0117514 | A1* | 6/2006 | Yagi | B60S 1/583 15/250.3 |
| 2013/0255408 | A1* | 10/2013 | Tokizaki | B60S 1/08 74/42 |
| 2013/0333141 | A1* | 12/2013 | Geubel | B60S 1/245 15/250.29 |
| 2017/0334314 | A1* | 11/2017 | Takada | B60N 2/1635 |

\* cited by examiner

MOTOR WITH SPEED REDUCTION MECHANISM

CROSS-REFERENCE TO RELATED APPLICATIONS

This application is based upon and claims the benefit of priority from prior Japanese Patent Application No. 2018-005866, filed on Jan. 17, 2018, the entire contents of which are incorporated herein by reference.

TECHNICAL FIELD

The present disclosure relates to a motor incorporating a speed reduction mechanism.

BACKGROUND ART

When a motor is used as a drive source of, for example, a rear wiper device mounted on a vehicle, the motor includes a speed reducer so the motor is reduced in size and outputs high power.

Patent Document 1 discloses a motor incorporating a speed reduction mechanism including a speed reducer. The speed reducer includes a worm, a worm wheel, and a sector gear. The motor incorporating a speed reduction mechanism includes a motion conversion member including the sector gear. The motion conversion member converts rotation of the motor into reciprocating pivoting motion. The speed reduction mechanism is a single stage speed reduction mechanism and includes a single reduction gear disposed between the worm and the sector gear.

PRIOR ART DOCUMENT

Patent Document

Patent Document 1: Japanese Laid-Open Patent Publication No. 2012-137114

SUMMARY OF THE INVENTION

Problems that the Invention is to Solve

As in Patent Document 1, when a single stage speed reduction mechanism is used, the speed reduction mechanism needs to be enlarged in order to increase the reduction ratio. In addition, since the sector gear of the motion conversion member pivots, a large space is needed for allowing the pivoting of the sector gear. This hinders reduction in size.

It is an objective of the present disclosure to provide a motor that incorporates a speed reduction mechanism and increases the reduction ratio and limits enlargement of the speed reduction mechanism.

Means for Solving the Problems

The objective of the present disclosure is achieved by the following configurations. In a first aspect of the present disclosure, a motor incorporates a speed reduction mechanism and includes a motor unit, a speed reduction mechanism that reduces speed of rotation of a rotation body of the motor unit; a motion conversion mechanism that converts rotary motion of the speed reduction mechanism into reciprocating rotary motion and transmits the motion to an output shaft, and a housing that accommodates the speed reduction mechanism and the motion conversion mechanism. The speed reduction mechanism includes a worm disposed on a rotation shaft of the motor unit, a first gear that transmits rotation of the worm and rotates about a first shaft disposed in the housing, and a second gear that receives rotation of the first gear and rotates about a second shaft disposed in the housing at a position different from the first shaft. The motion conversion mechanism includes a rotary member that includes a sector gear and rotates about an axis of the first shaft and a rod that couples the second gear and the rotary member. The output shaft includes an output gear that engages the sector gear.

In a second aspect, the sector gear is disposed on an end of the rotary member opposite to the rod.

In a third aspect, the rotary member is rotationally supported by one of a shaft member shared with the first gear, a recess or a projection disposed on an end surface of the first gear, and a shaft member projecting from an end surface of the first gear.

In a fourth aspect, the rod is disposed so that at least a portion of the rod is held between the rotary member and the second gear or the rod is disposed at the same side of the rotary member and the second gear in a direction extending along an axis of one of the first shaft and the second shaft.

In a fifth aspect, the first shaft is disposed at one side of an axis of the rotation shaft as viewed in an axial direction of the output shaft. The second shaft is disposed at the other side of the axis of the rotation shaft as viewed in the axial direction of the output shaft.

In a sixth aspect, the motion conversion mechanism includes a coupling member coupled to the first shaft and the output shaft.

In a seventh aspect, the housing includes a cover member that closes an opening of the housing. The coupling member includes a coupling portion that couples the first shaft and the output shaft and a contact portion that contacts the cover member. The coupling portion and the contact portion are integrally formed.

In an eighth aspect, the contact portion is formed of an elastic rubber member.

In a ninth aspect, the rod is curved or bent so that the rod includes a central recess.

In a tenth aspect, the output shaft is disposed to project toward an opening of the housing.

In an eleventh aspect, as viewed in an axial direction of the output shaft, the second shaft and the first shaft are disposed at different positions in a longitudinal direction of the worm.

In a twelfth aspect, the speed reduction mechanism includes at least one of one or more first reduction gears or one or more second reduction gears. The one or more first reduction gears transmit rotation of the first gear to the second gear. The one or more second reduction gears transmit rotation of the worm to the first gear.

Effects of the Invention

According to the first aspect, the speed reduction mechanism reduces speed at two or more steps using at least two gears, namely, the first gear and the second gear. Thus, the reduction ratio is increased. In addition, the rotary member rotates about the axis of the first shaft, which is the rotation center of the first gear. Thus, the moving range of the rotary member is reduced. In addition, since the axis of the first shaft, which is the shaft of the first gear, coincides with the axis of the rotary member including the sector gear, a large portion of the rotary member overlaps the first gear as viewed in the direction of the output shaft. Thus, enlargement in the area of the speed reduction mechanism is limited as viewed in the direction of the output shaft.

According to the second aspect, the sector gear is disposed on an end of the rotary member opposite to the rod. This limits enlargement of the rotary member. In addition, the sector gear is reciprocally rotated in an appropriate manner by power applied from the rod to the rotary member.

According to the third aspect, the rotary member is rotationally supported by one of the shaft member shared with the first gear, the recess or projection disposed on an end surface of the first gear, and the shaft member projecting from an end surface of the first gear. This allows the rotary member and the first gear to share the axis of the first shaft as the rotation center and increases the degree of freedom for designing.

According to the fourth aspect, the rod may be disposed so that at least a portion of the rod is held between the rotary member and the second gear. Alternatively, the rod may be disposed at the same side of the rotary member and the second gear in a direction extending along the axis of the first shaft or the second shaft. This increases the degree of freedom for designing.

According to the fifth aspect, as viewed in the axial direction of the output shaft, the first shaft is disposed at one side of the axis of the rotation shaft, and the second shaft is disposed at the other side of the axis of the rotation shaft. This limits enlargement of the speed reduction mechanism at only one of the two sides of the axis of the rotation shaft. Accordingly, enlargement of an unused space defined between the speed reduction mechanism and the motor unit is limited.

According to the sixth aspect, the coupling member is coupled to the first shaft and the output shaft. This reduces backlash in the axial and radial directions of the output shaft. In addition, since the rotary member rotates about the first shaft, the coupling member does not move. This simplifies the structure of the coupling member and eases the designing.

According to the seventh aspect, the coupling portion and the contact portion are integrally formed. This reduces the number of components and the number of assembling steps.

According to the eighth aspect, the coupling member does not move. This allows the contact portion to be manufactured from an inexpensive rubber elastic coupling member. As a result, the manufacturing is simplified, and the material cost is reduced.

According to the ninth aspect, the rod is curved or bent so that the rod is provided with the central recess. This allows the rod to avoid contact with the first shaft and limits enlargement of the area of the motion conversion mechanism as viewed in the axial direction of the output shaft.

According to the tenth aspect, when used in a rear wiper device, the motor incorporating a speed reduction mechanism may be mounted on a surface of a mount bracket opposite to an inner panel mount surface so that the output shaft projects toward the inner panel. This allows a mount leg of the bracket to be shorter and reduces the size and weight of the mount bracket. Furthermore, the mount bracket may be used as the cover member.

According to the eleventh aspect, as viewed in the axial direction of the output shaft, enlargement of the speed reduction mechanism is limited in a direction orthogonal to the axial direction of the rotation shaft. In addition, the degree of freedom for the layout of the first shaft and the second shaft is increased. Thus, the degree of freedom for designing each component is increased.

According to the twelfth aspect, a multistage reduction gear is used. This limits increases in the size and increases the reduction ratio. As a result, the motor unit may be further reduced in size.

BRIEF DESCRIPTION OF THE DRAWINGS

FIG. 3 is an operational diagram of FIG. 1 showing the automatic rest position (0°) in FIG. 3A, the position rotated by 90° in FIG. 3B, the position of one-half pivot angle in FIG. 3C, the position in which the rod is closest to the first shaft in FIG. 3D, the position rotated by 180° in FIG. 3E, and the position rotated by 270° in FIG. 3F.

FIG. 4 shows modified examples of a first shaft in which

FIG. 5 shows modified examples of rod positions in which

MODES FOR CARRYING OUT THE INVENTION

A motor incorporating a speed reduction mechanism according to the present disclosure will now be described below in detail with reference to the drawings. The embodiments described below exemplify a motor incorporating a speed reduction mechanism for embodying technical concepts of the present disclosure. The present disclosure is not limited to the embodiments and is also applicable to other embodiments included in the scope of the claims.

First Embodiment

A first embodiment of a motor 1 incorporating a speed reduction mechanism according to the present disclosure will now be described with reference to FIGS. 1 to 5. In the following examples, the motor 1 incorporating a speed reduction mechanism is used to drive a rear wiper device. However, the usage of the motor 1 incorporating a speed reduction mechanism is not limited to driving of a rear wiper device.

Figure 1:
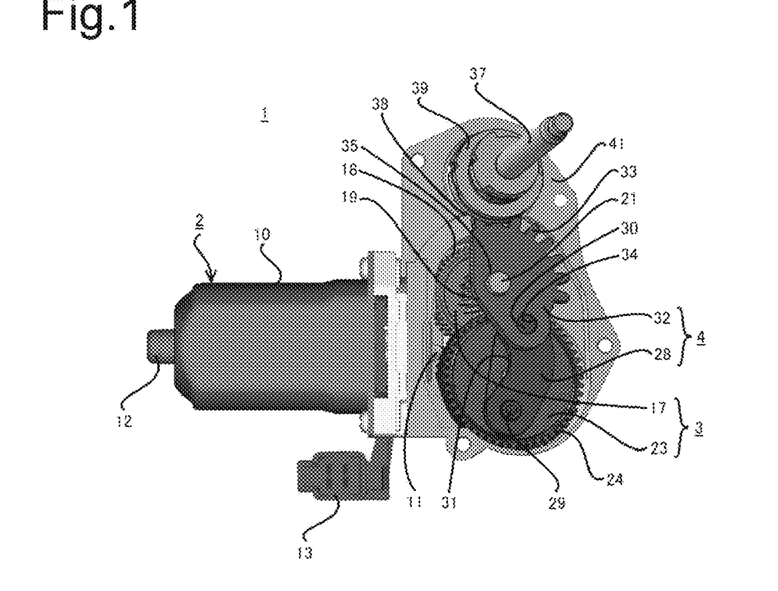
FIG. 1 is a perspective view showing a first embodiment of a motor incorporating a speed reduction mechanism.
Figure 2:
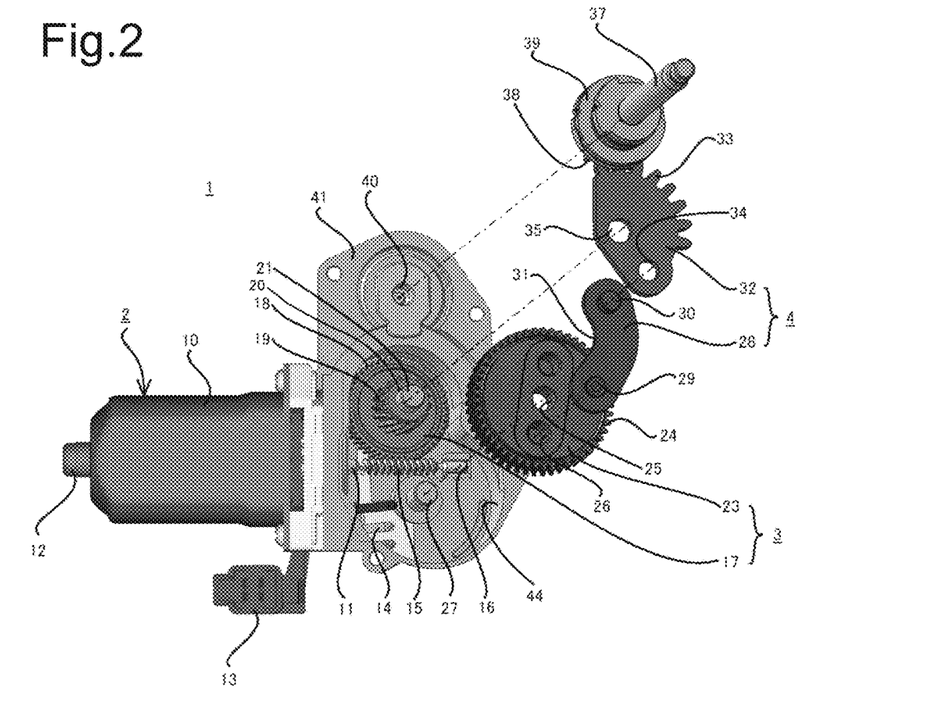
FIG. 2 is a partial exploded perspective view of FIG. 1.

FIG. 1 is a perspective view of the motor 1 of the first embodiment incorporating a speed reduction mechanism. FIG. 2 is a partial exploded perspective view of FIG. 1. The motor 1 incorporating a speed reduction mechanism includes a motor unit 2, a housing 41, a speed reduction mechanism 3, a motion conversion mechanism 4, and a cover member (not shown) that covers and closes at least an opening of the housing 41.

The motor unit 2 includes a motor case 10, a bearing 12, and a connector 13. An example of the motor case 10 has a cylindrical shape having a wall end and is formed of magnetic material such as iron. For example, two-pole or four-pole permanent magnets 42 (refer to FIG. 6) are disposed in the motor case 10. The permanent magnets 42 are opposed to an armature 43 (refer to FIG. 6). A rotation shaft 11 is disposed in the center of the armature 43. One end of the rotation shaft 11 is rotationally supported by the bearing 12. The type of the motor is not particularly limited and may be, for example, a two-pole brushed motor. In a brushed DC motor, brushes are disposed on a stator to supply power to the armature 43, and a commutator is disposed on the armature 43.

The housing 41 has a substantially rectangular shape having a wall end and includes an accommodation portion 44 that accommodates the speed reduction mechanism 3 and the motion conversion mechanism 4. The short sides of the housing 41 extend in an axial direction of the rotation shaft 11. The long sides of the housing 41 extend in a direction orthogonal to the axis of the rotation shaft 11. The housing 41 may be obtained, for example, by die casting aluminum or an aluminum alloy. As viewed from a direction of an output shaft 37, a first gear 17 and the output shaft 37 are disposed at one side of a worm 15, and a second gear 23 is disposed at the other side of the worm 15.

The worm 15 is disposed on a distal side of the rotation shaft 11. The worm 15 has a distal end rotationally supported by a worm bearing 16. The worm 15 may be, for example, formed integrally with the rotation shaft 11 or may be, for example, connected to the distal end of the rotation shaft 11.

As viewed in the axial direction of the output shaft 37, a first shaft 21 is fixed to the housing 41 and extends toward the opening of the housing 41 at one side (hereafter, referred to as "the one side") in a direction orthogonal to both the axis of the worm 15 and the axis of the output shaft 37. Also, the first gear 17, which is flat-disc-shaped, is rotationally disposed at the one side. The first gear 17 is formed by a large diameter toothed wheel 18 and a small diameter toothed wheel 19. The large diameter toothed wheel 18 is disposed at a rear side of the first gear 17 (toward the wall end of the housing 41 in the axial direction of the output shaft 37) and engages the worm 15. The small diameter toothed wheel 19 is coaxial with the large diameter toothed wheel 18 and is disposed at a front side of the first gear 17 (toward the opening of the housing 41 in the axial direction of the output shaft 37). A first shaft through hole 20 extends through the center of the first gear 17. When the first shaft 21 is inserted through the first shaft through hole 20, the first gear 17 is rotational relative to the first shaft 21. The material of the first gear 17 may be, for example, resin. However, the material is not limited to resin and may be, for example, metal.

As viewed in the axial direction of the output shaft 37, a second shaft 27 is fixed to the housing 41 and extends toward the opening of the housing 41 at the other side (side opposite to the one side, hereafter, referred to as "the other side") in the direction orthogonal to both the axis of the worm 15 and the axis of the output shaft 37. Also, the second gear 23, which is flat-disc-shaped, is rotationally disposed at the other side. The outer circumference of the second gear 23 includes outer teeth 24 that engage the small diameter toothed wheel 19. A second shaft through hole 25 extends through the center of the second gear 23. When the second shaft 27 is inserted through the second shaft through hole 25, the second gear 23 is rotational relative to the second shaft 27.

In the first embodiment, as viewed in the axial direction of the output shaft 37, the first shaft 21 (the axis of the first shaft 21) is disposed at one side of the worm 15, and the second shaft 27 (the axis of the second shaft 27) is disposed at the other side of the worm 15. However, limitations are not imposed on the layout of the first shaft 21 and the second shaft 27. For example, the first shaft and the second shaft may be disposed at only one of the two sides of the worm 15 as viewed in the axial direction of the output shaft 37. In the axial direction of the worm 15, the second shaft 27 (the axis of the second shaft 27) is located closer to the distal end of the worm 15 (side opposite to the motor unit 2) than the first shaft 21 (the axis of the first shaft 21). However, the layout of the first shaft 21 and the second shaft 27 is not particularly limited. For example, the second shaft 27 may be located closer to the motor unit 2 than the first shaft 21 in the axial direction of the worm 15. The first shaft 21 and the second shaft 27 may be located at the same position in the axial direction of the worm 15.

The front side of the second gear 23 includes two rod coupling recesses 26 at predetermined positions between the second shaft through hole 25 and the outer teeth 24 in a radial direction. The two rod coupling recesses 26 are disposed, for example, symmetrically (separated by 180°) about the second shaft through hole 25. The rod coupling recess 26 may be a recess having a closed end or may be a through hole. The material of the second gear 23 may be, for example, resin. However, the material is not limited to resin and may be, for example, metal.

Although not shown in the drawings, a conductive plate is disposed at the rear side of the second gear 23. When the conductive plate is in contact with a contact plate 14, the conductive plate is electrically connected to the contact plate 14. The contact state and the non-contact state with the contact plate 14 change in accordance with the pattern of the conductive plate, so that even when a wiper switch is switched off in the middle of driving a wiper arm (located at position other than lower reversal position), the wiper arm is controlled to stop at the lower reversal position.

One of the rod coupling recesses 26 receives a second-gear-side projection 29 of a rod 28, which will be described later. Depending on which one of the rod coupling recesses 26 the second-gear-side projection 29 is inserted through, the rest position of the wiper arm is selected from the lower reversal position and an upper reversal position. The number of rod coupling recesses 26 is not limited to two and maybe, for example, another plural number such as four or may be one.

The rod 28 is disposed at the front side of the second gear 23. The rod 28 is flat and elongated and is curved like a round bracket. In an example, the rod 28 is flat and elongated and is curved at a side opposite to the motor unit 2 in a direction orthogonal to the straight line connecting the second-gear-side projection 29 and a rotary-member-side projection 30, which will be described later, as viewed from the output shaft 37. The rod 28 may be formed of, for example, metal such as iron or sintered metal. The second-gear-side projection 29 projects rearward (toward the wall end of the housing 41) from one longitudinal end of the rod 28. The rotary-member-side projection 30 projects frontward (toward the opening of the housing 41) from the other longitudinal end of the rod 28.

Since the rod 28 is curved like a round bracket, the rod 28 has a central portion including a recess 31 that is open toward the motor unit 2. The recess 31 allows the rod 28 to avoid contact with the first shaft 21 when the rod 28 pivots in accordance with rotation of the second gear 23. In the present embodiment, the central portion of the rod 28 includes the recess 31 that is open toward the motor unit 2.

However, there is no limitation to such a configuration. For example, a straight elongated rod including no recess may be used. The rod 28 may be bent to form a recess in the central portion of the rod 28.

A flat semicircular rotary member 32 is disposed at the front side of the rod 28. The rotary member 32 may be formed of, for example, metal such as iron or sintered metal. A rotation center hole 35 extends in a substantially circle center of the semicircular rotary member 32. A rod-side through hole 34 extends through one end of the arc of the rotary member 32. The rotary member 32 includes a sector gear 33 extending along the arc excluding the one end. The sector gear 33 includes multiple projections extending radially outward from the arc of the rotary member 32. The rotary-member-side projection 30 of the rod 28 is rotationally inserted into the rod-side through hole 34. More specifically, the sector gear 33 is disposed on an end of the rotary member 32 opposite to the rod 28.

The first shaft 21, which is inserted in the first gear 17, is rotationally inserted in the rotary member 32. More specifically, the first shaft 21 is inserted into the rotation center hole 35 of the rotary member 32. That is, the first gear 17 and the rotary member 32 share the first shaft 21 as the rotation center. The axis of the first gear 17, the rotation center of the rotary member 32, and the axis of the first shaft 21 coincide with each other. The rotary member 32 is located at the front side of the first gear 17 (toward the opening of the housing 41).

The output shaft 37 extends frontward (toward the opening of the housing 41) from one side of the first gear 17 (side opposite to the second shaft 27). The output shaft 37 is rotationally supported by an output bearing 40 disposed on the housing 41. An output gear 38 is disposed at a distal side of the output shaft 37 (toward the wall end of the housing 41). A clutch 39 is disposed at a front side of the output gear 38 (toward the distal end of the output shaft 37). Rotation of the output gear 38 is transmitted to the output shaft 37 via the clutch 39. The sector gear 33 engages the output gear 38. Rotation of the sector gear 33 reciprocally rotates the output gear 38. The output shaft 37 may project rearward (toward the wall end of the housing 41). In this case, the output shaft 37 extends through the wall end of the housing 41.

The clutch 39 is provided to limit overloads on the speed reduction mechanism 3 and/or the motion conversion mechanism 4 when an overload is applied to the wiper arm (output shaft 37). The clutch 39 is configured so that rotation of the output gear 38 is transmitted to the output shaft 37 during a normal operation (when the load applied to the wiper arm and the output shaft 37 is less than or equal to a predetermined value). The clutch 39 is configured to disengage the output shaft 37 from the output gear 38 so that the output shaft 37 rotates freely when an overload, which is greater than or equal to the predetermined value, is applied to the output shaft 37.

Operation of First Embodiment

The operation of the first embodiment will now be described. When the armature 43 is supplied with power from the connector 13 through the brushes and the commutator, the armature 43 (refer to FIG. 6) is rotated by repulsive and attractive forces acting between a magnetic field generated in the armature 43 and a field system of the permanent magnets 42 (refer to FIG. 6) disposed on the inner side of the motor case 10. Rotation of the armature 43 is transmitted from the rotation shaft 11 to the worm 15 and drives to rotate the first gear 17, which includes the large diameter toothed wheel 18 engaging the worm 15. In other words, engagement of the worm 15 with the large diameter toothed wheel 18 configures a first stage speed reduction mechanism.

Rotation of the first gear 17 is transmitted to the second gear 23 by the outer teeth 24 of the second gear 23, which engages the small diameter toothed wheel 19. In other words, engagement of the small diameter toothed wheel 19 with the outer teeth 24 configures a second stage speed reduction mechanism. The speed reduction mechanism 3 configures a two-stage speed reduction mechanism and thus increases the reduction ratio as compared to a single stage speed reduction mechanism. The first shaft 21, which is inserted in the first gear 17, and the second shaft 27, which is inserted in the second gear 23, are opposed to each other at opposite sides of the worm 15 as viewed in the axial direction of the output shaft 37. This limits enlargement of the speed reduction mechanism 3 at one side of the worm 15. In addition, enlargement of the region between the motor unit and the speed reduction mechanism (region at one side of the motor unit 2 and a side of the speed reduction mechanism toward the motor unit 2) that is formed when the speed reduction mechanism is enlarged at one side of the worm 15 is limited.

In addition, as viewed in the axial direction of the output shaft 37, the first shaft 21 and the second shaft 27 are located at separate positions in the axial direction of the worm 15. This limits enlargement in a direction orthogonal to the axial direction of the worm 15 and increases the degree of freedom for the layout of the first shaft 21 and the second shaft 27. Thus, the degree of freedom for designing each component is increased.

Rotation of the second gear 23 is transmitted to the rotary member 32 via the rod 28. At this time, as the rod 28 pivots in accordance with rotation of the second gear 23, the rotary member 32 reciprocally rotates. The second gear 23 side projection of the rod 28 is rotationally inserted into one of the rod coupling recesses 26 of the second gear 23. The selection of the rod coupling recess 26 may set the wiper arm so as to stop at the lower reversal position. More specifically, when the conductive plate disposed at the rear side of the second gear 23 is electrically connected to the contact plate 14, the wiper arm is controlled to stop at the lower reversal position in accordance with the pattern of the conductive plate.

The rod 28 is curved like a round bracket (the central portion of the rod 28 includes the recess 31) as viewed in the axial direction of the output shaft 37. This allows the rod 28 to avoid contact with the first shaft 21 when the rod 28 pivots in accordance with rotation of the second gear 23. As viewed in the axial direction of the output shaft 37, enlargement in the area (moving range) of the motion conversion mechanism 4 is limited.

Figure 3A:
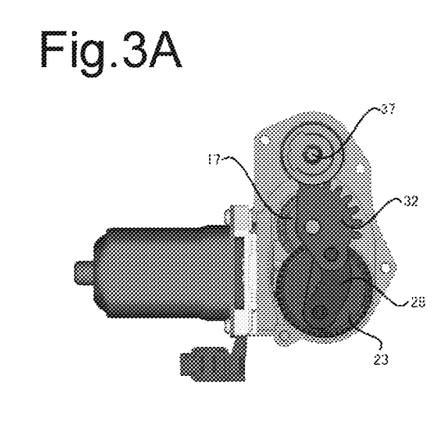
Figure 3B:
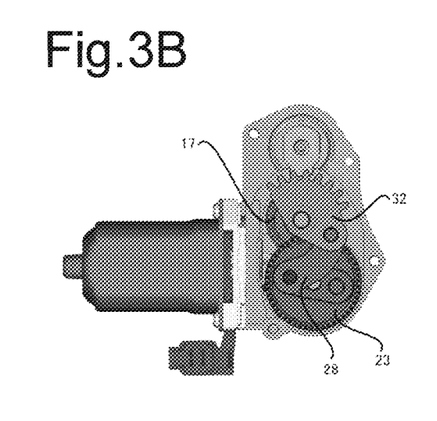
Figure 3C:
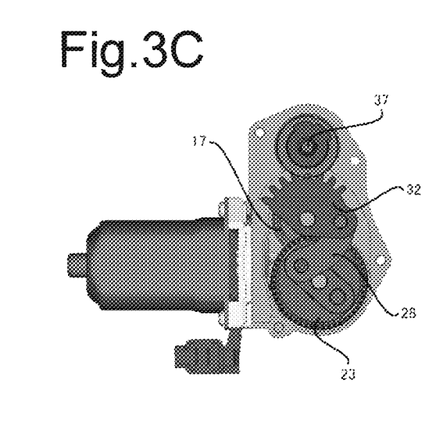
Figure 3D:
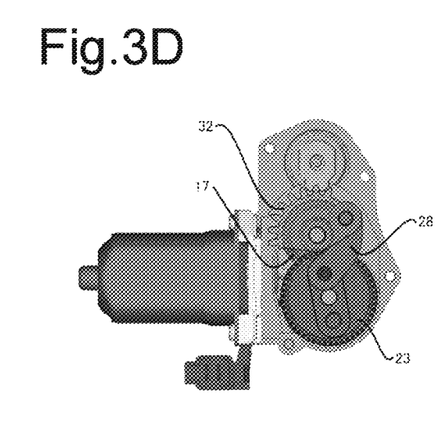
Figure 3E:
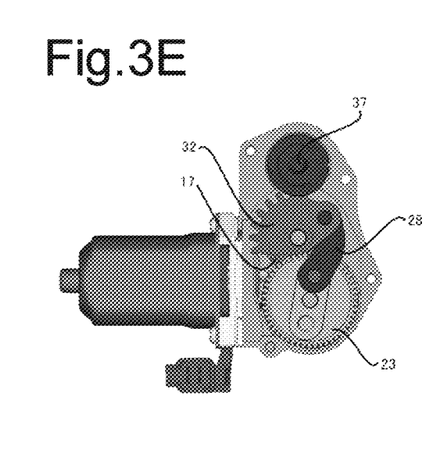
Figure 3F:
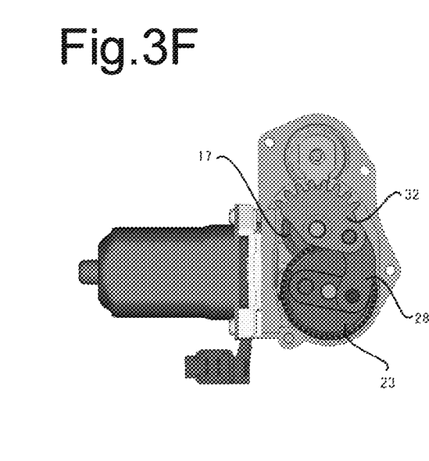

Pivoting motion of the rod 28 will now be described with reference to FIG. 3. FIG. 3A shows the automatic rest position (0°). FIG. 3B shows the position rotated by 90°. FIG. 3C shows the position of one-half pivot angle. FIG. 3D shows a position in which the rod 28 is closest to the first shaft 21. FIG. 3E shows the position rotated by 180°. FIG. 3F shows the position rotated by 270°.

FIG. 3A shows the automatic rest position (0°), which corresponds to the position where the wiper arm stops at the lower reversal position. At this position, the rotational angle of the sector gear 33 of the rotary member 32 is at the maximum rotation stroke in the clockwise direction, and the second-gear-side projection 29 of the rod 28 and the rotary member 32 are located at opposite sides of the second shaft 27.

FIG. 3B shows the position rotated by 90°, which corresponds to a position of the second gear 23 rotated clockwise by 90° from the position shown in FIG. 3A (automatic rest position). At this position, the rotary member 32 is slightly rotated counterclockwise from the position shown in FIG. 3A, the second-gear-side projection 29 of the rod 28 is rotated clockwise by 90° from the position shown in FIG. 3A, and the rod 28 is located slightly toward the first shaft 21.

FIG. 3C shows the position of one-half pivot angle, which corresponds to a position where the rotational angle of the sector gear 33 of the rotary member 32 is at exactly one-half of the rotation stroke. At this position, the rotary member 32 is further rotated counterclockwise from the position shown in FIG. 3B, the second-gear-side projection 29 of the rod 28 is further rotated clockwise from the position shown in FIG. 3B, and the rod 28 is located further toward the first shaft 21.

FIG. 3D shows the position in which the rod 28 is closest to the first shaft 21 and shows that the recess 31 of the rod 28 is designed and shaped so as not to contact the first shaft 21. At this position, the rotary member 32 is further rotated counterclockwise from the position shown in FIG. 3C, the second-gear-side projection 29 of the rod 28 is further rotated clockwise from the position shown in FIG. 3C, and the recess 31 of the rod 28 is closest to the first shaft 21.

FIG. 3E shows the position rotated by 180°, which corresponds to the position of the second gear 23 rotated clockwise by 180° from the position shown in FIG. 3A (default rest position). At this position, the rotational angle of the sector gear 33 of the rotary member 32 is at the maximum rotation stroke in the counterclockwise direction. At this position, the second-gear-side projection 29 of the rod 28 is located close to the first shaft 21, and the rotary-member-side projection 30 of the rod 28 is located close to the output shaft 37. When the second gear 23 is rotated more than 180°, the rotation direction of the rotary member 32 is reversed and becomes the clockwise direction.

FIG. 3F shows the position rotated by 270°, which corresponds to the position of the second gear 23 rotated clockwise by 270° from the position shown in FIG. 3A (automatic rest position). At this position, the second-gear-side projection 29 of the rod 28 is moved away from the first shaft 21, the rotary member 32 is rotated in the clockwise direction from the position shown in FIG. 3E, and the rod 28 is moved away from the first shaft 21.

Because the rotary member 32 reciprocally rotates about the first shaft 21, the moving range of the rotary member 32 is reduced. The rotary member 32 is disposed closer to the opening of the housing 41 than the position where the first gear 17 engages the worm 15 in the axial direction of the first gear 17. In addition, the rotation center of the rotary member 32 is the first shaft 21, which is shared with the first gear 17. Hence, a large portion of the rotary member 32 overlaps the first gear 17 as viewed in the axial direction of the output shaft 37. In addition, a large portion of the moving region in which the rod 28 pivots overlaps the first gear 17 and the second gear 23. Therefore, as viewed in the axial direction of the output shaft 37, the areas of the speed reduction mechanism 3 and the motion conversion mechanism 4 are reduced. Ultimately, enlargement of the housing 41 is limited.

The sector gear 33 is disposed on the end of the rotary member 32 opposite to the rod-side through hole 34. This limits enlargement of the rotary member 32. In addition, the sector gear is reciprocally rotated in an appropriate manner by power applied from the rod 28 to the rotary member. In addition, while maintaining the distance between the rotation center hole 35 and the rod-side through hole 34, the sector gear 33 is disposed in an appropriate manner.

The output shaft 37 projects away from the wall end of the housing 41 (toward the cover member). When the motor 1 of the first embodiment incorporating a speed reduction mechanism is used in a rear wiper device, the motor 1 incorporating a speed reduction mechanism may be mounted on a surface of a mount bracket opposite to an inner panel mount surface so that the output shaft projects toward the inner panel (mount bracket). This allows a mount leg of the mount bracket to be shorter and reduces the size and weight of the mount bracket. Furthermore, the mount bracket may be used as the cover member.

As described above, the rod 28 pivots in accordance with rotation of the second gear 23 and drives to reciprocally rotate the rotary member 32. The sector gear 33 of the rotary member 32 engages the output gear 38. The output shaft 37 is connected to the output gear 38 by the clutch 39. Thus, the output shaft 37 is driven to reciprocally rotate.

The output shaft 37 is connected to the wiper arm, which is not shown in the drawings. The distal end of the wiper arm supports a wiper blade. The wiper arm and the wiper blade pivot in a predetermined range in accordance with reciprocating rotary motion of the output shaft 37, so that the wiper blade is configured to reciprocally wipe a windshield surface between the upper reversal position and the lower reversal position.

The output shaft 37 is connected to the output gear 38 by the clutch 39, so that overloads on the speed reduction mechanism 3 and/or the motion conversion mechanism 4 are limited when an overload is applied to the wiper arm. The clutch 39 may be omitted. In this case, the output shaft 37 is directly connected to the output gear 38. This may simplify the structure of an output unit including the output shaft 37 and the output gear 38.

Modified examples of the first shaft will now be described with reference to FIG. 4.

First Modified Example

Figure 4A:
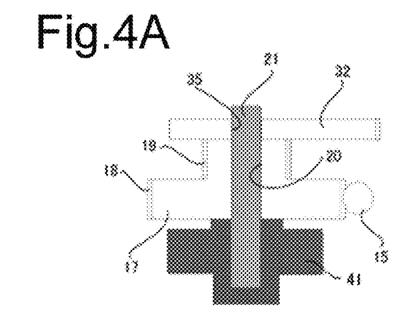
FIG. 4A shows an example corresponding to FIGS. 1 and 2.

FIG. 4A shows an example corresponding to FIGS. 1 and 2. The first shaft 21 is disposed in the housing 41. The first shaft 21 is inserted through the first gear 17 so that the first gear 17 is disposed at the wall end of the housing 41, and is inserted through the rotary member 32 so that the rotary member 32 is disposed at the front side of the first gear 17 (toward the opening of the housing 41). More specifically, in this example, the first shaft 21 is used as the rotation shaft shared by the first gear 17 and the rotary member 32. The first shaft 21 is inserted through the first shaft through hole 20 in the first gear 17 to rotationally support the first gear 17. The rotary member 32 is stacked on the first gear 17 at the front side of the first shaft 21 from the first gear 17. The first shaft 21 is inserted through the rotation center hole 35 in the rotary member 32 to rotationally support the rotary member 32.

When the housing 41 needs to be spaced apart from the first gear 17 by a predetermined gap, an annular projection extending from the housing 41 toward the first gear 17 and/or an annular projection extending from the first gear toward the housing 41 may be disposed around the first shaft 21. The same configuration is applied to the cases shown in FIG. 4B, FIG. 4C, and FIG. 4D described below. Moreover, this is not limited to the first shaft. When two stacked members are configured to be spaced apart from each other, a technique of disposing an annular projection around a shaft may be used in the same manner.

Second Modified Example

Figure 4B:
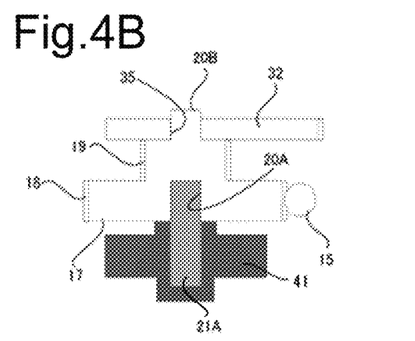
FIG. 4B shows an example in which the first gear includes a projection.

FIG. 4B shows an example in which the first gear 17 includes a projection. A first shaft 21A that is shorter than the first shaft 21 of the example shown in FIG. 4A is disposed in the housing 41. The first shaft 21A is inserted into a first shaft insertion hole 20A of the first gear 17. The first gear 17 is rotational relative to the first shaft 21A. A first shaft corresponding projection 20B is disposed at the front side of the first gear 17 coaxially with the first shaft 21A. The first shaft corresponding projection 20B is inserted into the rotation center hole 35 of the rotary member 32. The rotary member 32 is rotational relative to the first shaft corresponding projection 20B.

Third Modified Example

Figure 4C:
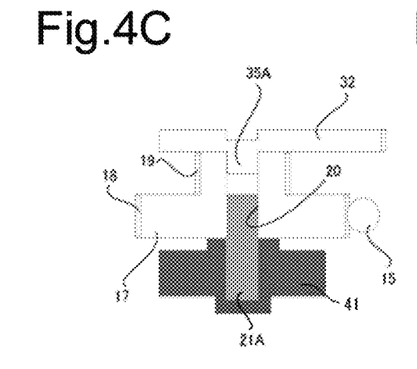
FIG. 4C shows an example in which the first gear includes a recess.

FIG. 4C shows an example in which the first gear 17 includes a recess. A first shaft 21A that is shorter than the first shaft 21 of the example shown in FIG. 4A is disposed in the housing 41. The first shaft 21A is inserted into the first shaft insertion hole 20 of the first gear 17. The first gear 17 is rotational relative to the first shaft 21A. The rotary member 32 includes a rotation center projection 35A extending toward the first gear. The rotation center projection 35A of the rotary member 32 is inserted into the front side of a first shaft insertion hole 20 of the first gear 17 and is rotational relative to the first gear 17. It is desirable that the rotation center projection 35A is spaced apart from the first shaft 21A by a predetermined gap in the first shaft insertion hole 20.

In the illustrated example, the first shaft through hole 20 has a fixed diameter in the axial direction. However, the present disclosure is not limited to such a configuration. For example, an insertion hole may be provided in the center of each of the front side and the rear side of the first gear 17 without extending through the first gear 17. Alternatively, first shaft through holes 20 or insertion holes in the front side and the rear side of the first gear 17 may have different diameters. The diameters of the first shaft through holes 20 or insertion holes in the front side and the rear side of the first gear 17 correspond to the respective diameters of the rotation center projection 35A and the first shaft 21A.

Fourth Modified Example

Figure 4D:
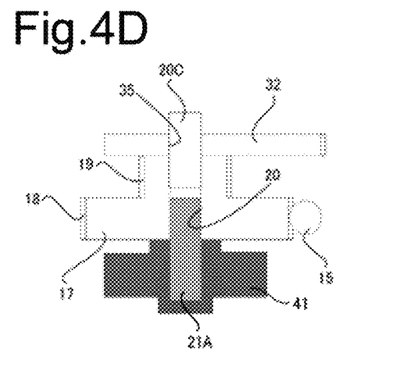
FIG. 4D shows an example in which the first gear includes a pin.

FIG. 4D shows an example in which the first gear 17 includes a pin. A first shaft 21A that is shorter than the first shaft 21 of the example shown in FIG. 4A is disposed in the housing 41. The first shaft 21A is inserted into the first shaft insertion hole 20 of the first gear 17. The first gear 17 is rotational relative to the first shaft 21A. A pin 20C, which corresponds to a shaft member, is inserted into the first shaft insertion hole 20 to project from the front side. The pin 20C is inserted into the rotation center hole 35, so that the rotary member 32 is rotational relative to the pin 20C. It is desirable that the pin 20C is spaced apart from the first shaft 21A by a predetermined gap in the first shaft insertion hole 20.

In the illustrated example, the first shaft through hole 20 has a fixed diameter. However, the present disclosure is not limited to such a configuration. For example, an insertion hole may be provided in the center of each of the front side and the rear side of the first gear 17 without extending through the first gear 17. First shaft through holes 20 or insertion holes in the front side and the rear side of the first gear 17 may have different diameters. The diameters of the first shaft through holes 20 or insertion holes in the front side and the rear side of the first gear 17 correspond to the respective diameters of the pin 20C and the first shaft 21A. The diameter of the pin 20C corresponds to the diameter of the rotation center hole 35 in the rotary member 32.

Although the examples shown in FIGS. 4A to 4D are described, the present disclosure is not limited to these. Any mode may be used as long as the axis of the first shaft 21, the axis of the first gear 17, and the rotation center of the rotary member 32 coincide with each other. Since the first shaft 21 may have various modes as described above, the degree of freedom for designing is increased.

Modified examples of the position of the rod 28 will now be described with reference to FIG. 5.

Fifth Modified Example

Figure 5A:
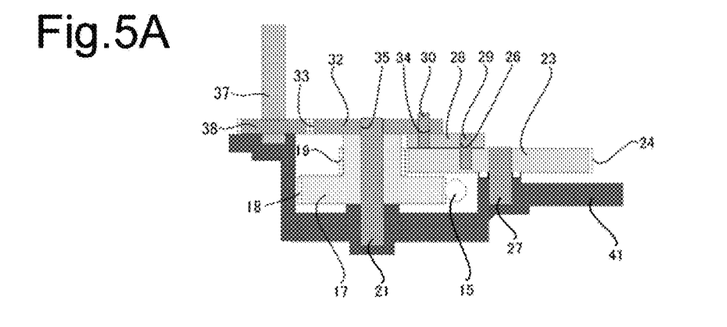
FIG. 5A shows an example corresponding to FIGS. 1 and 2.

FIG. 5A shows an example corresponding to FIGS. 1 and 2. In the example, the rod 28 is partially held between the second gear 23 and the rotary member 32. The rod 28 includes the second-gear-side projection 29, which projects rearward from the (right in FIG. 5A) end located toward the second gear 23, and the rotary-member-side projection 30, which projects frontward from the end (left in FIG. 5A) located toward the rotary member 32. In an example, the second-gear-side projection 29 and the rotary-member-side projection 30 may be formed integrally with the rod 28. In another example, a pin-shaped separate member may be inserted into a through hole that extends through the rod 28.

The second-gear-side projection 29 of the rod 28 is inserted into one of the rod coupling recesses 26 in the second gear 23 from the front side. The second-gear-side projection 29 is rotational relative to the rod coupling recess 26. The rotary-member-side projection 30 is inserted into the rod-side through hole 34 in the rotary member 32 from the rear side. The rotary-member-side projection 30 is rotational relative to the rotary member 32 in the rod-side through hole 34. As described above, when the rod 28 is held between the second gear 23 and the rotary member 32, the rod 28 pivots in accordance with rotation of the second gear 23 to reciprocally rotate the rotary member 32 about the rotation center hole 35.

Sixth Modified Example

Figure 5B:
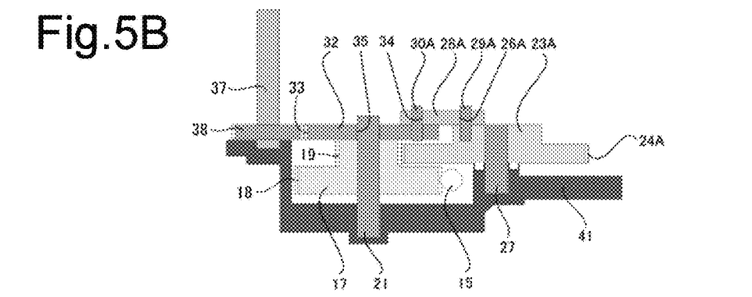
FIG. 5B shows an example in which the rod is located at the same side of a rotary member and a second gear in a direction extending along the axis of the rod.

FIG. 5B shows an example in which a rod 28A is located at the same side (side toward the opening of the housing 41) of the rotary member 32 and a second gear 23A in a direction extending along the axis of the rod 28A. The rod 28A includes a second-gear-side projection 29A and a rotary-member-side projection 30A. The second-gear-side projection 29A projects rearward from the (right in FIG. 5B) end of the rod 28A located toward the second gear 23A. The rotary-member-side projection 30A projects frontward from the (left in FIG. 5B) end of the rod 28A located toward the rotary member 32. In an example, the second-gear-side projection 29A and the rotary-member-side projection 30A may be formed integrally with the rod 28A. In another example, a pin-shaped separate member may be inserted into a through hole that extends through the rod 28A.

The second-gear-side projection 29A of the rod 28A is inserted into one of multiple rod coupling recesses 26A in the second gear 23A from the front side. The second-gear-side projection 29A is rotational relative to the rod coupling recess 26A. The rotary-member-side projection 30A of the rod 28A is inserted into the rod-side through hole 34 of the rotary member 32. The rotary-member-side projection 30A is rotational relative to the rotary member 32 in the rod-side through hole 34. As described above, when the rod 28A is located at the front side of the second gear 23A and the rotary member 32, the rod 28A pivots in accordance with rotation of the second gear 23A to reciprocally rotate the rotary member 32 about the rotation center hole 35.

Although the examples shown in FIGS. 5A and 5B are described, the present disclosure is not limited to these. The position of the rod 28 may be changed in any manner as long as the rod 28 pivots in accordance with rotation of the second gear 23 to reciprocally rotate the rotary member 32 about the rotation center hole 35. Since the position of the rod may have various modes as described above, the degree of freedom for designing is increased. The examples of the first embodiment do not include a coupling member 50, which will be described later. However, the coupling member 50 may be provided to reduce backlash in the axial and radial directions of the output shaft. In this case, the coupling member 50 may be disposed at the front side or the rear side of the rotation member 32.

Second Embodiment

Figure 6:
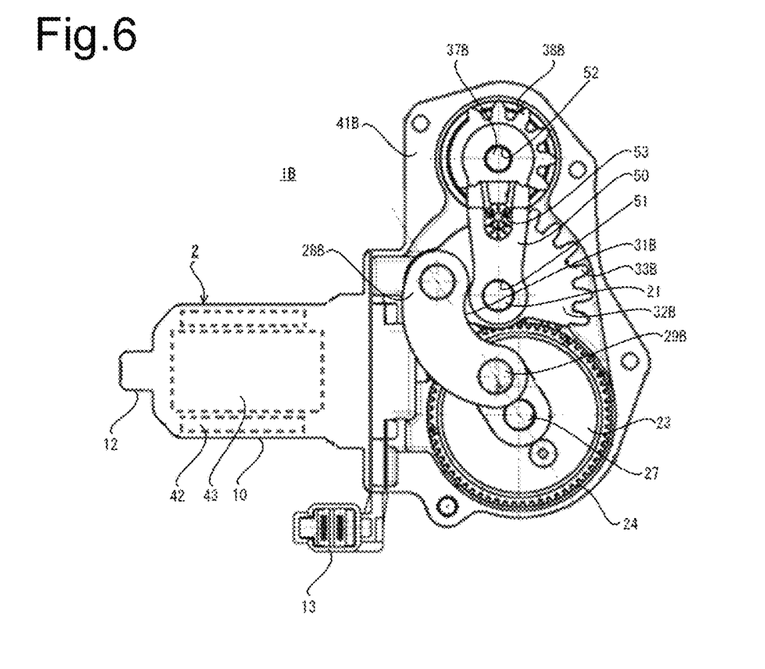
FIG. 6 is a plan view showing a second embodiment of a motor incorporating a speed reduction mechanism.

A second embodiment of a motor 1B incorporating a speed reduction mechanism according to the present disclosure will now be described with reference to FIG. 6. FIG. 6 is a plan view showing the motor 1B of the second embodiment incorporating a speed reduction mechanism. The same reference numerals are given to those components that are the same as the corresponding components shown in FIGS. 1 to 5. Such components will not be described in detail. The second embodiment differs from the first embodiment in the layout of a rod 28B and a rotary member 32B, the projection direction of an output shaft 37B, and provision of the coupling member 50.

When the armature 43 is supplied with power from the connector 13 through the brushes and the commutator, the armature 43 is rotated by repulsive and attractive forces acting between a magnetic field generated in the armature 43 and a field system of the permanent magnets 42 disposed in the inner side of the motor case 10. Although not shown in FIG. 6, rotation of the armature 43 is transmitted from the rotation shaft 11 to the worm 15 to drive and rotate the first gear 17, which includes the large diameter toothed wheel 18 engaging the worm 15. Engagement of the worm 15 with the large diameter toothed wheel 18 configures a first stage speed reduction mechanism.

Also, although not shown in FIG. 6, rotation of the first gear 17 is transmitted to the second gear 23 by the outer teeth 24 of the second gear 23, which engages the small diameter toothed wheel 19. Engagement of the small diameter toothed wheel 19 with the outer teeth 24 configures a second stage speed reduction mechanism. The speed reduction mechanism 3 configures a two-stage speed reduction mechanism and thus increases the reduction ratio as compared to a single stage speed reduction mechanism. The first shaft 21, which is inserted in the first gear 17, and the second shaft 27, which is inserted in the second gear 23, are opposed to each other at opposite sides of the worm 15 as viewed in the axial direction of the output shaft 37. This limits enlargement of the speed reduction mechanism 3 at one side of the worm 15.

In addition, as viewed in the axial direction of the output shaft 37, the first shaft 21 and the second shaft 27 are located at separate positions in the axial direction of the worm 15. This limits enlargement in a direction orthogonal to the axial direction of the worm 15 and increases the degree of freedom for the layout of the first shaft 21 and the second shaft 27. Thus, the degree of freedom for designing each component is increased.

Rotation of the second gear 23 is transmitted to the rotary member 32B via the rod 28B. At this time, as the rod 28B pivots in accordance with rotation of the second gear 23, the rotary member 32B reciprocally rotates. A second-gear-side projection 29B of the rod 28B is rotationally inserted into one of the rod coupling recesses 26 of the second gear 23. The selection of the rod coupling recess 26 sets the wiper arm so as to stop at the lower reversal position. More specifically, when the conductive plate disposed at the rear side of the second gear 23 is electrically connected to the contact plate 14, the wiper arm is controlled to stop at the lower reversal position in accordance with the pattern of the conductive plate.

The rod 28B is curved as a round bracket (the central portion of the rod 28B includes the recess 31B) as viewed in the axial direction of the output shaft 37B. Thus, when the rod 28B pivots in accordance with rotation of the second gear 23, contact with the first shaft is avoided. This limits enlargement of the area of the motion conversion mechanism 4.

In the second embodiment, the rod 28B is disposed toward the motor unit 2. Hence, the curving direction of the rod 28B is opposite to that of the first embodiment. That is, the central portion of the rod 28B includes a recess 31B that is open at the side opposite to the motor unit 2. Accordingly, positions of a rod-side through hole 34B (not shown) and a sector gear 33B of the rotary member 32B differ from those in the first embodiment. More specifically, the rod-side through hole 34B extends in the end located toward the motor unit 2, and the sector gear 33B is disposed on the end opposite to the motor unit 2.

The position of the rod 28B in the direction of the output shaft 37B corresponds to that in the sixth modified example of the first embodiment (FIG. 5B). That is, the rod 28B is located at the same side (front side) of the rotary member 32B and the second gear 23 in the direction extending along the axis of the rod 28B.

The sector gear 33B of the rotary member 32B engages the output gear 38B. The output shaft 37B is connected to the output gear 38B by a clutch 39B. Thus, reciprocating rotation of the rotary member 32B drives to reciprocally rotate the output shaft 37B. In the second embodiment, the output shaft 37B extends through a through hole in the housing 41B and projects rearward.

When the output shaft 37B extends through and projects from the housing 41B and the motor 1B of the second embodiment incorporating a speed reduction mechanism is used in a rear wiper device, the motor 1B incorporating a speed reduction mechanism is mounted on a surface of the mount bracket located at the same side as the inner panel mount surface, and the output shaft 37B is disposed to project in the same direction (direction projecting from the housing 41B).

In the second embodiment, the coupling member 50 is provided to reduce backlash in the axial and radial directions of the output shaft 37B. The coupling member 50 is disposed at the front side of the rotary member 32B and the output gear 38B between the cover member (not shown) and the rotary member 32B and the output gear 38B. The first shaft 21 is inserted into a first shaft insertion hole 51 that extends in one end of the coupling member 50. The output shaft 37B is inserted into an output-shaft-side insertion hole 52 that extends in the other end of the coupling member 50. Although the first shaft 21 and/or the output shaft 37B are described as being inserted, there is no limit to the first shaft 21 and/or the output shaft 37B completely extending through the first shaft insertion hole 51 or the output-shaft-side insertion hole 52. The first shaft 21 and/or the output shaft 37B may remain in the hole, or an end surface of each shaft may be flush with an end surface defining the hole.

An elastic member 53 is disposed on a central portion of the coupling member 50 and used as a contact portion. The elastic member 53 is configured to contact the cover member and press the coupling member 50 rearward. The material of the elastic member 53 is not particularly limited and may be rubber or resin. In the motor 1B of the second embodiment incorporating a speed reduction mechanism, the rotary member 32B reciprocally rotates about the first shaft 21, and the rotation center of the rotary member 32B is constantly fixed. The position of the coupling member 50 will not move.

This allows the elastic member 53 that is formed from, for example, rubber to be used to press the coupling member 50 rearward. An elastic rubber member is easy to process and can be manufactured at a low cost. The elastic rubber member absorbs vibration and reduces noise in addition to reducing backlash in the axial and radial directions of the output shaft and has a superior property as an elastic member. In addition, when the elastic member 53 is molded integrally with the coupling member 50, the manufacturing may be more simplified, and the number of assembling steps may be reduced.

The output shaft 37B is connected to the wiper arm, which is not shown in the drawings. The distal end of the wiper arm supports a wiper blade. The wiper arm and the wiper blade pivot in a predetermined range in accordance with reciprocating rotary motion of the output shaft 37B, so that the wiper blade is configured to reciprocally wipe the windshield between the upper reversal position and the lower reversal position.

The output shaft 37B is connected to the output gear 38B by the clutch 39B, which is not shown in the drawings, so that overloads on the speed reduction mechanism 3 and/or the motion conversion mechanism 4 are limited when an overload is applied to the wiper arm. The clutch 39B is configured so that rotation of the output gear 38B is transmitted to the output shaft 37B during a normal operation (when the load applied to the wiper arm and the output shaft 37B is less than or equal to a predetermined value). The clutch 39B is configured to disengage the output shaft 37B from the output gear 38B so that the output shaft rotates freely when an overload, which is greater than or equal to the predetermined value, is applied to the output shaft 37B. The clutch 39B may be omitted. In this case, the output shaft 37B is directly connected to the output gear 38B. This may simplify the structure of an output unit including the output shaft 37B and the output gear 38B.

Third Embodiment

Figure 7:
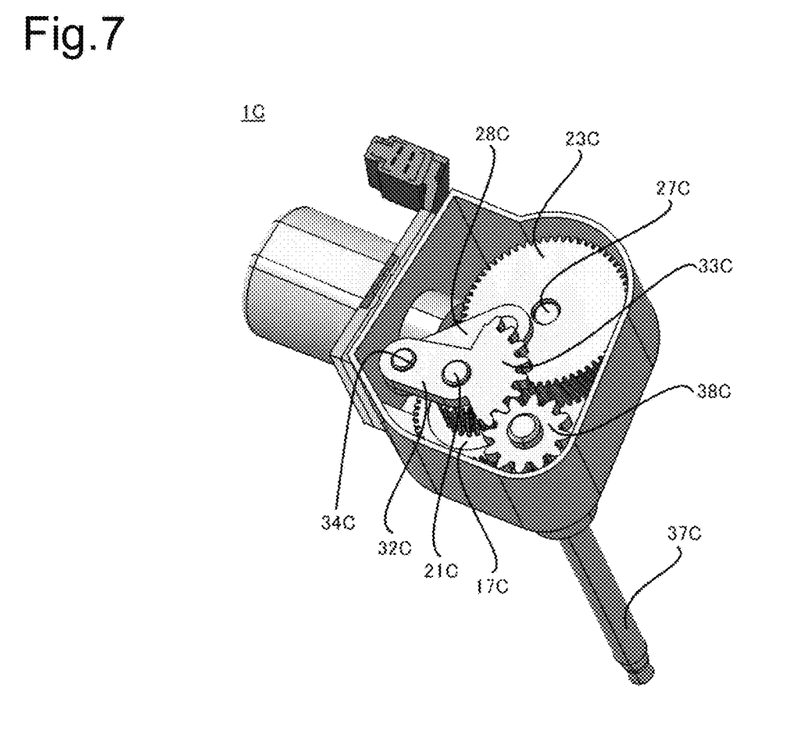
FIG. 7 is a perspective view showing a third embodiment of a motor incorporating a speed reduction mechanism.
Figure 8:
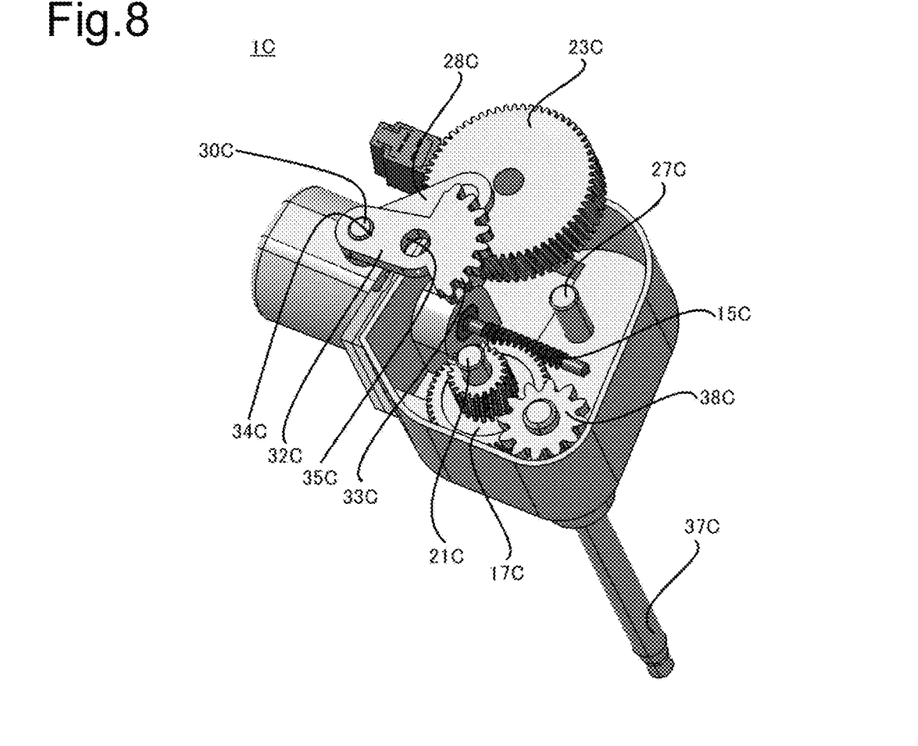
FIG. 8 is a partial exploded perspective view of FIG. 7.

A third embodiment of a motor 1C incorporating a speed reduction mechanism according to the present disclosure will now be described with reference to FIGS. 7 and 8. FIG. 7 is a perspective view of the motor of the third embodiment incorporating a speed reduction mechanism. FIG. 8 is a partial exploded perspective view of FIG. 7. The same reference numerals are given to those components that are the same as the corresponding components shown in FIGS. 1 to 6. Such components will not be described in detail. The third embodiment differs from the second embodiment in the position of an output shaft 37C. Accordingly, the position of each gear is changed from that of the second embodiment.

In the second embodiment, the output shaft 37B is disposed relative to the rotary member 32 to be located next to the first gear (the rotary member 32B) in a direction substantially orthogonal to the axis of the worm 15 as viewed in the axial direction of the output shaft 37B. In the third embodiment, the output shaft 37C is disposed closer to the distal end of the worm 15 than a first gear 17C (rotary member 32C) in a substantially axial direction of the worm 15. Thus, the dimension is reduced in a direction orthogonal to the axial direction of the worm 15. Even when the second gear 27C is enlarged to increase the reduction ratio, an unused space is effectively used by adjusting the layout of the output shaft 37C.

As viewed in the axial direction of the output shaft 37C, the second shaft 27C is located closer to the distal end of the worm than the first shaft 21C in the axial direction of the worm 15. Although the rod 28C is rectangular in plan view, the layout of gears in the third embodiment prevents the rod 28C from contacting the first shaft 21C. Depending on the layout of gears, the rod 28C may be shaped as a round bracket as in the second embodiment so that the recess 31B is used to avoid contact with the first shaft 21C.

The rotary member 32C linearly extends to one side from the rotation center hole 35C and includes the rod-side through hole 34C in the end. At the other side of the rotation center hole 35C, the rotary member 32C is semicircular and includes the sector gear 33C along the circumference. The shape of the rotary member 32C and the positions of the rod-side through hole 34C and the sector gear 33C may be changed in accordance with the layout of gears.

In the same manner as the second embodiment, the output shaft 37C projects in a direction extending through the housing 41C. Although the coupling member 50C is not shown in FIGS. 7 and 8, the coupling member 50C may be disposed at the front side of the first shaft 21C and the output shaft 37C. The coupling member 50C reduces backlash in the axial and radial directions of the output shaft 37C.

As viewed in the axial direction of the output shaft 37C, the side of the axis of the worm 15C at which the first shaft 21C or the second shaft 27C is disposed may be determined in accordance with the specification of the motor 1C incorporating a speed reduction mechanism. In this case, when the first shaft 21C and the second shaft 27C are opposed to the axis of the worm 15C, enlargement of the speed reduction mechanism 3C at only one of the two sides of the axis of the worm 15C in the direction orthogonal to the axis of the worm 15C may be limited as viewed in the axial direction of the output shaft 37C. The position and direction of the connector 13 may also be set in accordance with the specification of the motor 1C incorporating a speed reduction mechanism.

Fourth Embodiment

Figure 9:
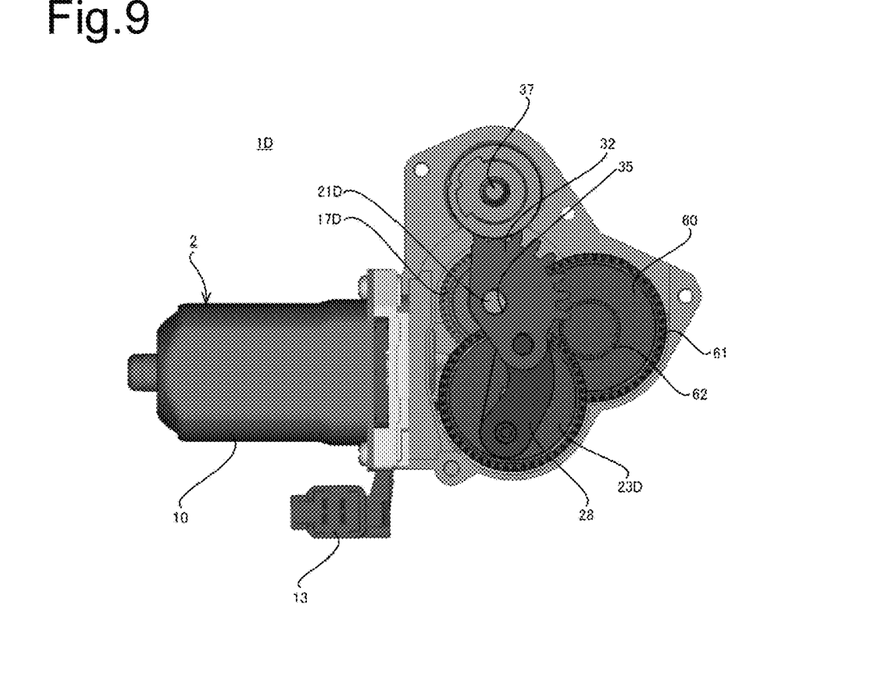
FIG. 9 is a plan view showing a fourth embodiment of a motor incorporating a speed reduction mechanism.

A fourth embodiment of a motor 1D incorporating a speed reduction mechanism according to the present disclosure will now be described with reference to FIG. 9. FIG. 9 is a plan view showing the motor of the fourth embodiment incorporating a speed reduction mechanism. The same reference numerals are given to those components that are the same as the corresponding components shown in FIGS. 1 to 8. Such components will not be described in detail. The fourth embodiment differs from the first to third embodiments in that a speed reduction mechanism 3D includes a three-stage speed reduction mechanism.

The motor 1D of the fourth embodiment incorporating a speed reduction mechanism includes a third gear 60, which corresponds to a first reduction gear in which a large diameter toothed wheel 61 and a small diameter toothed wheel 62 are integrally formed, between the first gear 17D and the second gear 23D. The third gear 60 is formed from, for example, a resin material. However, the material is not limited to resin and may be, for example, metal. The small diameter toothed wheel 19 of the first gear 17D engages the large diameter toothed wheel 61 of the third gear 60. The small diameter toothed wheel 62 of the third gear 60 engages the outer teeth 24 of the second gear 23D.

Rotation of the rotation shaft 11, which is driven and rotated by the motor unit 2, is transmitted from the rotation shaft 11 to the worm 15 to drive and rotate the first gear 17D, which includes the large diameter toothed wheel 18D engaging the worm 15. Engagement of the worm 15 with the large diameter toothed wheel 18D configures a first stage speed reduction mechanism.

Rotation of the first gear 17D is transmitted to the large diameter toothed wheel 61 of the third gear 60, which engages the small diameter toothed wheel 19D. Engagement of the small diameter toothed wheel 19D with the large diameter toothed wheel 61 of the third gear 60 configures a second stage speed reduction mechanism.

Rotation of the third gear 60 is transmitted to the outer teeth 24D of the second gear 23D, which engages the small diameter toothed wheel 62 of the third gear 60. Engagement of the small diameter toothed wheel 62 with the outer teeth 24D configures a third stage speed reduction mechanism.

As described above, the motor 1D of the fourth embodiment incorporating a speed reduction mechanism includes the three-stage speed reduction mechanism and thus increases the reduction ratio. Although the example including a three-stage speed reduction mechanism is described in the fourth embodiment, the present disclosure is not limited to such a configuration. For example, a multistage speed reduction mechanism having four or more stages may be configured. In the fourth embodiment, the first reduction gear is added between the first gear 17D and the second gear 23D. However, the present disclosure is not limit to such a configuration. For example, one or more second reduction gears may be added between the worm 15 and the first gear 17D. In this case, the first shaft 21D is the rotation center of the first gear 17D disposed at the second or subsequent stage, and the first shaft 21D is inserted through the rotation center hole 35 in the rotary member 32.

Further, for example, in addition to one or more second reduction gears added between the worm 15 and the first gear 17D, one or more first reduction gears may be added between the first gear 17D and the second gear 23D.

The invention claimed is:

1. A motor incorporating a speed reduction mechanism, the motor comprising:
   a motor unit;
   a speed reduction mechanism that reduces speed of rotation of a rotation body of the motor unit;
   a motion conversion mechanism that converts rotary motion of the speed reduction mechanism into reciprocating rotary motion and transmits the motion to an output shaft; and
   a housing that accommodates the speed reduction mechanism and the motion conversion mechanism, wherein
   the speed reduction mechanism includes a worm disposed on a rotation shaft of the motor unit, a first gear that transmits rotation of the worm and rotates about a first shaft disposed in the housing, and a second gear that receives rotation of the first gear and rotates about a second shaft disposed in the housing at a position different from the first shaft,
   the motion conversion mechanism includes a rotary member that includes a sector gear and rotates about an axis of the first shaft and a rod that couples the second gear and the rotary member, and
   the output shaft includes an output gear that engages the sector gear.

2. The motor according to claim 1, wherein the sector gear is disposed on an end of the rotary member opposite to the rod.

3. The motor according to claim 1, wherein the rotary member is rotationally supported by one of a shaft member shared with the first gear, a recess or a projection disposed on an end surface of the first gear, and a shaft member projecting from an end surface of the first gear.

4. The motor according to claim 1, wherein the rod is disposed so that at least a portion of the rod is held between the rotary member and the second gear or the rod is disposed at the same side of the rotary member and the second gear in a direction extending along an axis of one of the first shaft and the second shaft.

5. The motor according to claim 1, wherein
   the first shaft is disposed at one side of an axis of the rotation shaft as viewed in an axial direction of the output shaft, and
   the second shaft is disposed at the other side of the axis of the rotation shaft as viewed in the axial direction of the output shaft.

6. The motor according to claim 1, wherein the motion conversion mechanism includes a coupling member coupled to the first shaft and the output shaft.

7. The motor according to claim 6, wherein
   the housing includes a cover member that closes an opening of the housing,
   the coupling member includes a coupling portion that couples the first shaft and the output shaft and a contact portion that contacts the cover member, and
   the coupling portion and the contact portion are integrally formed.

8. The motor according to claim 7, wherein the contact portion is formed of an elastic rubber member.

9. The motor according to claim 1, wherein the rod is curved or bent so that the rod includes a central recess.

10. The motor according to claim 1, wherein the output shaft is disposed to project toward an opening of the housing.

11. The motor according to claim 1, wherein as viewed in an axial direction of the output shaft, the second shaft and the first shaft are disposed at different positions in a longitudinal direction of the worm.

12. The motor according to claim 1, wherein
   the speed reduction mechanism includes at least one of one or more first reduction gears or one or more second reduction gears,
   the one or more first reduction gears transmit rotation of the first gear to the second gear, and
   the one or more second reduction gears transmit rotation of the worm to the first gear.

* * * * *